US007959539B2

(12) United States Patent
Takeishi et al.

(10) Patent No.: US 7,959,539 B2
(45) Date of Patent: Jun. 14, 2011

(54) BODY MOTION DETECTION DEVICE CAPABLE OF PROPERLY MANAGING INFORMATION ON NUMBER OF STEPS IN WALKING EXERCISE

(75) Inventors: Naoki Takeishi, Osaka (JP); Kenji Eda, Aalsmeer (NL); Kenji Hashino, Suita (JP); Taiga Sato, Kyoto (JP); Yasuyuki Togoe, Yasu (JP)

(73) Assignee: Omron Healthcare Co., Ltd., Kyoto-shi (JP)

( * ) Notice: Subject to any disclaimer, the term of this patent is extended or adjusted under 35 U.S.C. 154(b) by 66 days.

(21) Appl. No.: 12/293,261

(22) PCT Filed: Oct. 2, 2007

(86) PCT No.: PCT/JP2007/069238
§ 371 (c)(1),
(2), (4) Date: Sep. 16, 2008

(87) PCT Pub. No.: WO2008/053657
PCT Pub. Date: May 8, 2008

(65) Prior Publication Data
US 2009/0054209 A1   Feb. 26, 2009

(30) Foreign Application Priority Data

Oct. 30, 2006  (JP) ................................ 2006-294296

(51) Int. Cl.
*A63B 71/00* (2006.01)
*A61B 5/103* (2006.01)
*G01C 21/00* (2006.01)

(52) U.S. Cl. ............................ 482/8; 600/595; 377/24.2

(58) Field of Classification Search .................. 482/1, 3, 482/8, 74, 148, 51; 600/595; 235/105; 377/24.2; 702/160; 968/411
See application file for complete search history.

(56) References Cited

U.S. PATENT DOCUMENTS 4,962,469 A * 10/1990 Ono et al. ...................... 702/160
5,033,013 A * 7/1991 Kato et al. .................... 702/160
5,586,957 A * 12/1996 Wilkinson ..................... 482/74
(Continued)

FOREIGN PATENT DOCUMENTS
EP         1 619 475        1/2006
(Continued)

OTHER PUBLICATIONS

Russian Office Action mailed Mar. 26, 2010, directed to counterpart Russian Application No. 2008147134/14(061663); 15 pages.
(Continued)

*Primary Examiner* — Loan Thanh
*Assistant Examiner* — Sundhara M Ganesan
(74) *Attorney, Agent, or Firm* — Morrison & Foerster LLP (57) ABSTRACT

A Nordic walking pole has a transmission device attached thereto and a switch thereof is pushed to transmit a signal indicating the start or end of Nordic walking. A pedometer receives the signal from the transmission device to thereby detect that the start or end of Nordic walking is instructed (S107). Assuming that the Nordic mode is specified when the current walking mode is a normal walking mode, the parameter for Nordic walking is set as a parameter for the arithmetic operation (S111). Assuming that the normal walking mode is specified when the current walking mode is a Nordic mode, the parameter for the normal walking mode is set as a parameter for the arithmetic operation (S113).

10 Claims, 7 Drawing Sheets

U.S. PATENT DOCUMENTS

| | | | | |
|---|---|---|---|---|
| 5,788,608 A | * | 8/1998 | Wilkinson | 482/51 |
| 5,839,461 A | * | 11/1998 | Lambeth, Jr. | 135/72 |
| 6,018,705 A | * | 1/2000 | Gaudet et al. | 702/176 |
| 6,418,181 B1 | * | 7/2002 | Nissila | 377/23 |
| 6,516,284 B2 | * | 2/2003 | Flentov et al. | 702/142 |
| 6,522,266 B1 | * | 2/2003 | Soehren et al. | 340/988 |
| 6,658,079 B1 | * | 12/2003 | Macklin et al. | 377/24.2 |
| 6,745,786 B1 | * | 6/2004 | Davis | 135/65 |
| 6,970,092 B2 | * | 11/2005 | Hum et al. | 340/573.4 |
| 7,172,563 B2 | * | 2/2007 | Takiguchi et al. | 600/595 |
| 7,200,517 B2 | * | 4/2007 | Darley et al. | 702/160 |
| 7,463,997 B2 | * | 12/2008 | Pasolini et al. | 702/160 |
| 2002/0013717 A1 | * | 1/2002 | Ando et al. | 705/4 |
| 2003/0114984 A1 | * | 6/2003 | Scherzinger | 701/216 |
| 2004/0094613 A1 | * | 5/2004 | Shiratori et al. | 235/105 |
| 2005/0197063 A1 | * | 9/2005 | White | 455/41.2 |
| 2005/0203701 A1 | * | 9/2005 | Scherzinger | 701/207 |
| 2007/0032981 A1 | * | 2/2007 | Merkel et al. | 702/160 |
| 2007/0073514 A1 | * | 3/2007 | Nogimori et al. | 702/160 |
| 2007/0143068 A1 | * | 6/2007 | Pasolini et al. | 702/160 |
| 2008/0072941 A1 | * | 3/2008 | Jackson et al. | 135/66 |
| 2008/0249740 A1 | * | 10/2008 | Verhaert | 702/160 |

FOREIGN PATENT DOCUMENTS

| | | |
|---|---|---|
| JP | 61-269785 | 11/1986 |
| JP | 61-296488 | 12/1986 |
| JP | 63-97179 | 4/1988 |
| JP | 63-311586 | 12/1988 |
| JP | 4-231979 | 8/1992 |
| JP | 5-137827 | 6/1993 |
| JP | 7-333000 | 12/1995 |
| JP | 8-75497 | 3/1996 |
| JP | 10-118052 | 5/1998 |
| JP | 11-56819 | 3/1999 |
| JP | 2000-131091 | 5/2000 |
| JP | 2002-291952 | 10/2002 |
| JP | 2004-509652 | 4/2004 |
| JP | 2004-520925 | 7/2004 |
| JP | 2006-118909 | 5/2006 |
| RU | 2 181 611 | 4/2002 |
| WO | WO-01/52718 | 7/2001 |
| WO | WO-03/002218 | 1/2003 |

OTHER PUBLICATIONS

"Nordic Walking-Japan Nordic Fitness Assocation—Website of Japan Nordic Fitness Aossciation officially authorized by International Nordic Walking Association (INWA) located at http://japan.nordicwalking.com/" visited on Feb. 22, 2008: 2 pages. (partial English translation).

International Search Report directed at application PCT/JP2007/069238; 1 page.

* cited by examiner

| POLE IDENTIFIER | MEMORY AREA | STRIDE LENGTH (cm) | BODY WEIGHT (kg) | ... |
|---|---|---|---|---|
| A | AREA A | 55 | 75 | ... |
| B | AREA B | 40 | 42 | ... |
| ⋮ | ⋮ | ⋮ | ⋮ | |

BODY MOTION DETECTION DEVICE CAPABLE OF PROPERLY MANAGING INFORMATION ON NUMBER OF STEPS IN WALKING EXERCISE

REFERENCE TO RELATED APPLICATIONS

This application is a national stage application under 35 USC 371 of International Application No. PCT/JP2007/069238, filed Oct. 2, 2007, as amended Dec. 26, 2007, which claims the priority of Japanese Patent Application No. 2006-294296, filed Oct. 30, 2006, the contents of both of which prior applications are incorporated herein by reference.

FIELD OF THE INVENTION

The present invention relates to a body motion detection device, an information transmission device, a Nordic walking pole, and a walking-exercise-amount calculation system, and particularly to a body motion detection device, an information transmission device, a Nordic walking pole, and a walking-exercise-amount calculation system which allow the information on the number of steps to be properly managed during walking exercise such as Nordic walking.

BACKGROUND OF THE INVENTION

A pedometer is conventionally known which is put on the body to detect the body motion and count the number of steps based on the information on the detected body motion.

There is a case where the stride length is set in the pedometer to use the stride length and the counted number of steps and calculate the amount of exercise such as a walking distance and calorie consumption. In this case, the stride length varies depending on the walking speed and the like. Accordingly, Japanese Laid-Open Patent Application No. 2006-118909 discloses a pedometer with which the stride length is calculated using the cycle and amplitude from the acceleration data obtained by the acceleration sensor. In this way, the amount of exercise is calculated from the information on the number of steps obtained by counting them, which is useful for the effective exercise. Thus, it is considered meaningful to manage the information on the number of steps in the walking exercise.

SUMMARY OF THE INVENTION

However, there are some walking exercises that are different in stride length, acceleration cycle and amplitude from daily walking. Thus, the number of steps is counted using the same pedometer as in daily walking, which poses a problem that the amount of exercise cannot be accurately calculated.

For example, such an exercise includes Nordic walking (or also referred to as Nordic fitness walking). For example, as presented in the website "NW-Nordic Walking", [online], Japan Nordic Fitness Association, [retrieved on Aug. 22, 2006], Internet, <URL:http://japan.nordicwalking.com/> and the like, Nordic walking is a walking exercise using poles having its origins in Europe, in which the stride length is greater than that in normal walking.

The above-mentioned Japanese Laid-Open Patent Application No. 63-311586 discloses an electronic pedometer capable of switching the setting of the stride length (stride length during running) between walking and running. However, the exercise state in which the detection device in Japanese Laid-Open Patent Application No. 63-311586 can count the number of steps includes different exercise types such as walking and running. Thus, the electronic pedometer in Japanese Laid-Open Patent Application No. 63-311586 poses a problem that the exact amount of exercise cannot be calculated in the case of the walking exercise such as Nordic walking which is different from normal walking.

Furthermore, as in the electronic pedometer in Japanese Laid-Open Patent Application No. 63-311586, it is inconvenient to perform switching operation each time the exercise state is changed. There is also a problem that, if the operation is incorrectly performed or forgotten, the exact amount of exercise cannot be calculated.

Noting that a Nordic walking pole is used as a tool to be used during exercise in the above-mentioned Nordic walking, it is conceivable to make use of the Nordic walking pole in order to obtain the exact amount of exercise with the pedometer during Nordic walking. For example, the above-mentioned Japanese Patent Laying-Open No. 5-137827 discloses a ski pole that functions as a transmitter/receiver of a transceiver and can be carried without degrading the exercise performance during skiing (though not a technique for calculating the amount of exercise).

The present invention has been made in light of the above-described problems and aims to provide a body motion detection device, an information transmission device, a Nordic walking pole to be used, and a walking-exercise-amount calculation system which allow the amount of walking exercise to be properly calculated using the Nordic walking pole in the walking exercise such as Nordic walking under the condition which is different from that in normal walking.

In order to achieve the above-described object, according to an aspect of the present invention, the body motion detection device includes a count unit counting the number of steps in a walking mode by detecting body motion, and a calculation unit calculating an amount of exercise based on the counted number of steps. The walking mode includes a first walking mode and a second walking mode. The body motion detection device further includes a receiving unit receiving from another device a signal indicating the start or end of the second walking mode, the signal containing information identifying the another device, and a setting unit setting, as a parameter used in the calculation unit, a parameter for the first walking mode or a parameter for the second walking mode based on the signal.

According to another aspect of the present invention, the information transmission device is attached to a tool to be used for walking exercise, and includes an instruction unit for giving an instruction to start or end the walking exercise and a transmitting unit for transmitting a signal responding to the instruction. The signal responding to the instruction includes a signal identifying the information transmission device.

According to still another aspect of the present invention, the Nordic walking pole includes an instruction unit for giving an instruction to start or end Nordic walking and a transmitting unit for transmitting a signal responding to the instruction.

According to still another aspect of the present invention, the walking-exercise-amount calculation system includes a body motion detection device having a count unit counting the number of steps in a walking mode by detecting body motion and a calculation unit calculating an amount of exercise based on the counted number of steps; and an information transmission device attached to a tool to be used for walking exercise. The information transmission device includes an instruction unit for giving an instruction to start or end the walking exercise and a transmitting unit for transmitting a signal responding to the instruction. The walking mode includes a first walking mode corresponding to a normal walking mode and a second walking mode corresponding to a walking mode in the walking exercise. The body motion detection device further includes a receiving unit receiving from the information transmission device a signal indicating the start or end of the second walking mode, and a setting unit setting, as a parameter used in the calculation unit, a parameter for the first walking mode or a parameter for the second walking mode based on the signal.

The present invention allows the parameter to be readily changed in the walking exercise such as Nordic walking in which the stride length is intentionally changed. This produces an effect that the amount of exercise can be more accurately calculated.

DETAILED DESCRIPTION OF THE INVENTION

The embodiments of the present invention will be hereinafter described with reference to the accompanying drawings, in which the same or corresponding components are designated by the same reference characters. Designations and functions thereof are also the same. In the embodiments described below, although the pedometer intended as a body motion detection device to be attached to the user's waist will be illustrated for description, the body motion detection device according to the present invention is not limited to those attached to the waist but may be those attached to the part other than the user's waist or an attachment part provided in the tool to be used. The tool to be used herein refers to a tool such as, specifically, a pole and a supporter used for assisting the walking exercise and an apparatus including clothes and ornaments such as special-purpose wear and shoes used in the walking exercise.

In the present embodiment, a walking-exercise-amount calculation system is configured to include a pedometer 100A corresponding to a body motion detection device and a Nordic walking pole (hereinafter simply referred to as a pole) 200 corresponding to a tool to be used for walking exercise.

Figure 1:
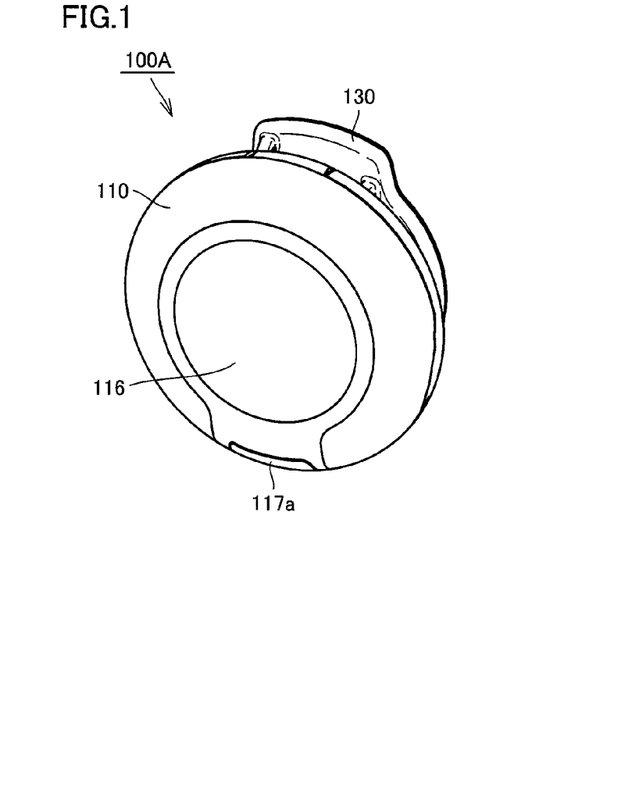
FIG. 1 is a diagram of a specific example of the external appearance of a pedometer.

FIG. 1 is a perspective view of pedometer 100A as seen obliquely from the upper right from the front.

Referring to FIG. 1, pedometer 100A in the present embodiment includes a main body unit 110 and a clip unit 130 for attachment to the user's waist.

In the present embodiment, main body unit 110 has a low-profile outer shape which is circular as seen from the front, and is provided with a display unit 116 on its front surface and a button 117a on its periphery. Display unit 116 is display means for displaying the body motion information detected by a body motion detection sensor and is preferably configured of a liquid crystal display panel (LCD). Button 117a is used for power-on, resetting of a counter and various settings, and a plurality of buttons 117a may be provided for each operation.

Main body unit 110 houses therein a circuit board provided with a processing circuit and the like for performing various process operations based on the signal output from the above-described body motion detection sensor or the present body motion detection sensor, and a battery 164 (see FIG. 2) for providing power supply to the processing circuit, and the like.

Figure 2:
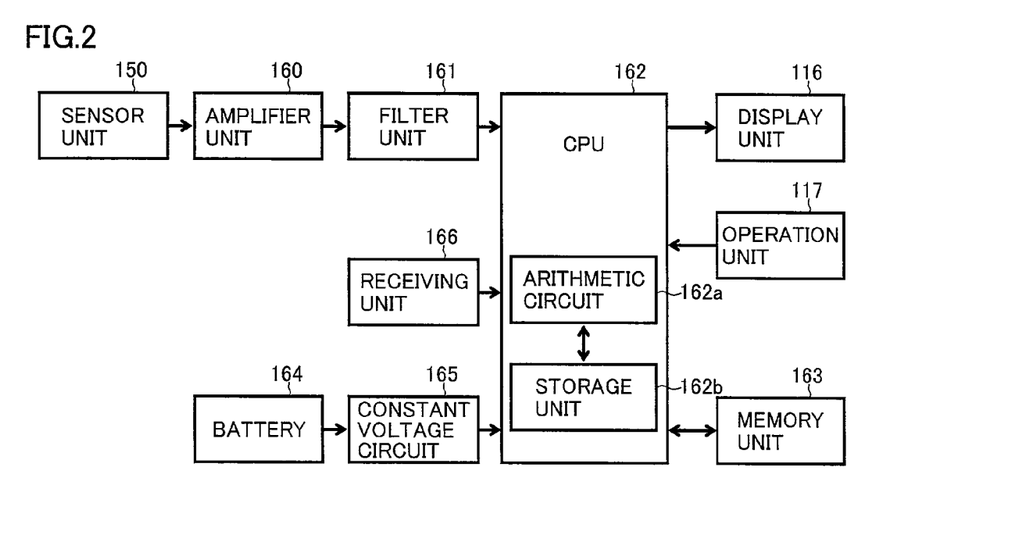
FIG. 2 is a block diagram of a specific example of the device configuration of the pedometer.

Referring to FIG. 2, in addition to a sensor unit 150 including the above-described body motion detection sensor, the above-described battery 164, an operation unit 117 including the above-described button 117a and display unit 116, pedometer 100A in the present embodiment is configured to include an amplifier unit 160, a filter unit 161, a CPU (Central Processing Unit) 162, a memory unit 163, and a constant voltage circuit 165 which is a circuit for stabilizing power supply voltage supplied from battery 164. It also includes a receiving unit 166 receiving data transmitted from a pole 200 described below. Furthermore, CPU 162 includes an arithmetic circuit 162a for performing the process described below and a storage unit 162b storing the information used in the process described below. It is to be noted that storage unit 162b may be located in the predetermined area of memory unit 163.

Amplifier unit 160 amplifies the electrical signal output from the body motion detection sensor of sensor unit 150 to input it into filter unit 161. The input electrical signal has the noise removed in filter unit 161 to be input into CPU 162.

Operation unit 117 inputs the operation signal based on the operation of button 117a into CPU 162. Furthermore, receiving unit 166 inputs into CPU 162 the data received from pole 200 described below.

Memory unit 163 has a program stored therein for performing various arithmetic processes. CPU 162 executes the above-mentioned program based on the operation signal input from operation unit 117 and the data from pole 200 input from receiving unit 166 to perform various arithmetic operations using the electrical signal input from filter unit 161 in arithmetic circuit 162a. CPU 162 issues a command to display various pieces of information such as a measurement result on display unit 116. CPU 162 stores the various pieces of information such as the measurement result in the predetermined area of memory unit 163.

Figure 3:
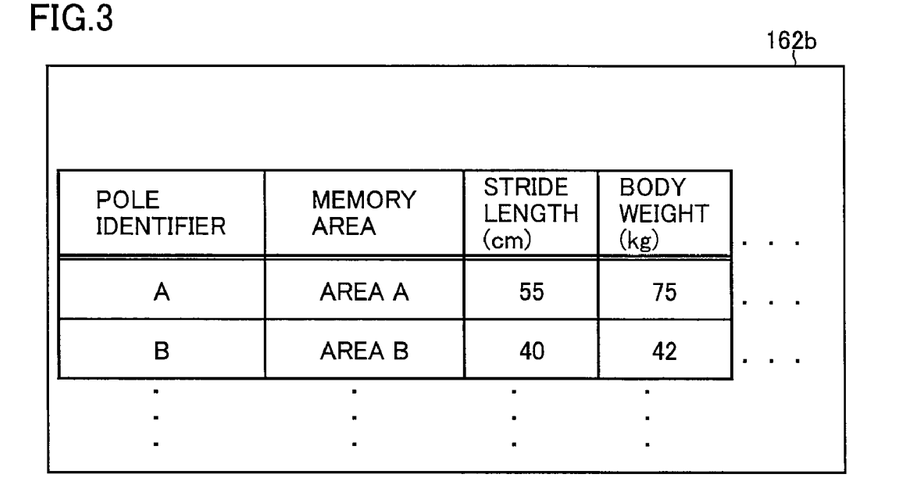
FIG. 3 is a diagram of a specific example of the information stored in a storage unit.

Storage unit 162b of CPU 162 stores a parameter, such as a stride length and body weight in the normal walking mode, which is used for calculating the amount of walking exercise (hereinafter simply referred to as an amount of exercise), set in operation unit 117 in advance and used for the arithmetic operation in arithmetic circuit 162a; and a storage area of memory unit 163 for storing the arithmetic result. As shown in FIG. 3, storage unit 162b further stores the parameter used for calculating the amount of exercise based on the number of steps measured during Nordic walking which is not a normal walking mode and the information specifying the storage area storing the result thereof. Specifically, it stores the correspondence between a pole identifier which is information specifying the pole described below and the storage area of memory unit 163 for storing various pieces of information such as the measurement result as well as a parameter such as stride length and body weight used for the arithmetic operation in arithmetic circuit 162a. If different equations are used between the case where the amount of exercise is calculated based on the number of steps measured in the normal walking mode and the case where the amount of exercise is calculated based on the number of steps measured during Nordic walking, storage unit 162b stores the information specifying the corresponding equation (program).

In the following description, the walking mode in normal walking is referred to as a normal walking mode and the walking mode in Nordic walking is referred to as a Nordic mode.

Figure 4:
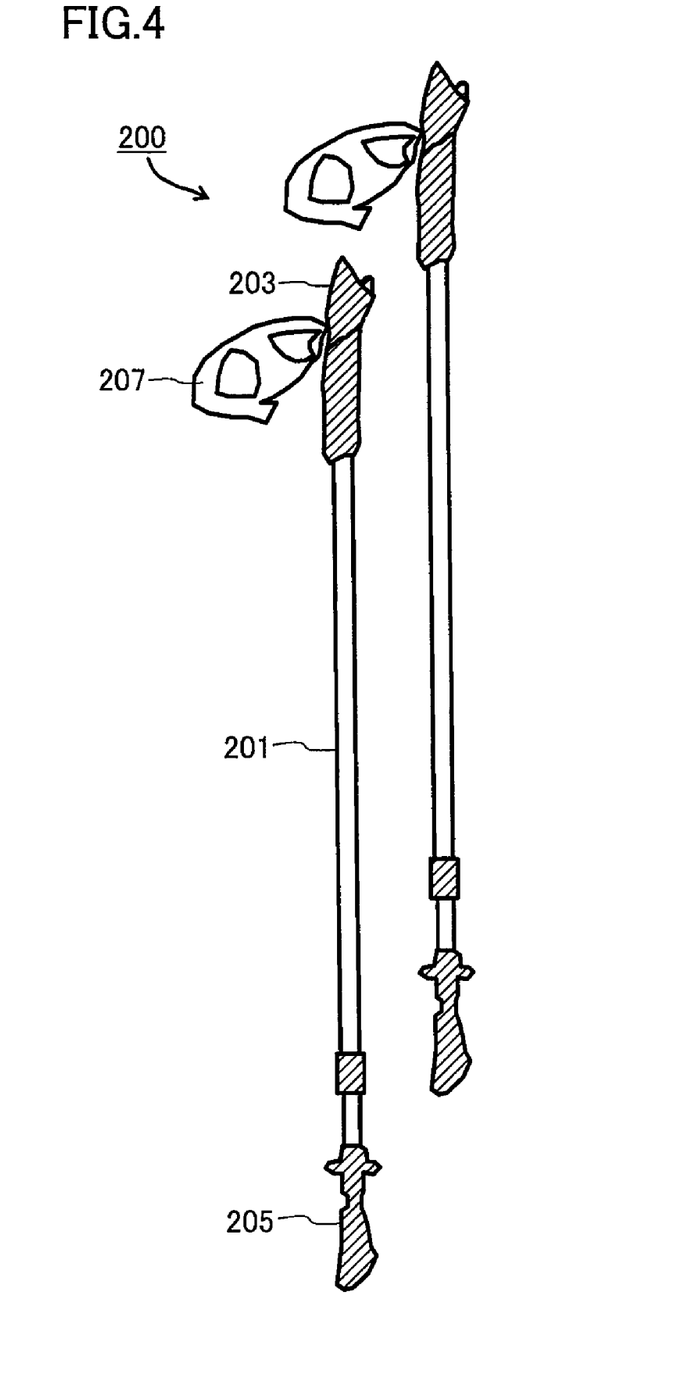
FIG. 4 is a diagram of a specific example of the external appearance of a pole.

Referring to FIG. 4, pole 200 includes a pair of right and left poles, each of which is equipped in the upper portion of a pole main body 201 with a grip 203 to be grasped by the user's hand, and also equipped in the lower portion thereof with a spike tip 205 that touches the ground. Furthermore, grip 203 is provided with a strap 207 for assisting the user in using pole 200. When pole 200 is used, strap 207 is attached to the user's hand without slack, in order that strap 207 is used to prevent pole 200 from becoming detached from the user's hand even in the case where the hand grasping grip 203 is completely opened.

FIG. 4 shows one specific example of the shape of pole 200, and the pole according to the present invention is not limited to the shape shown in FIG. 4.

Figure 5A:
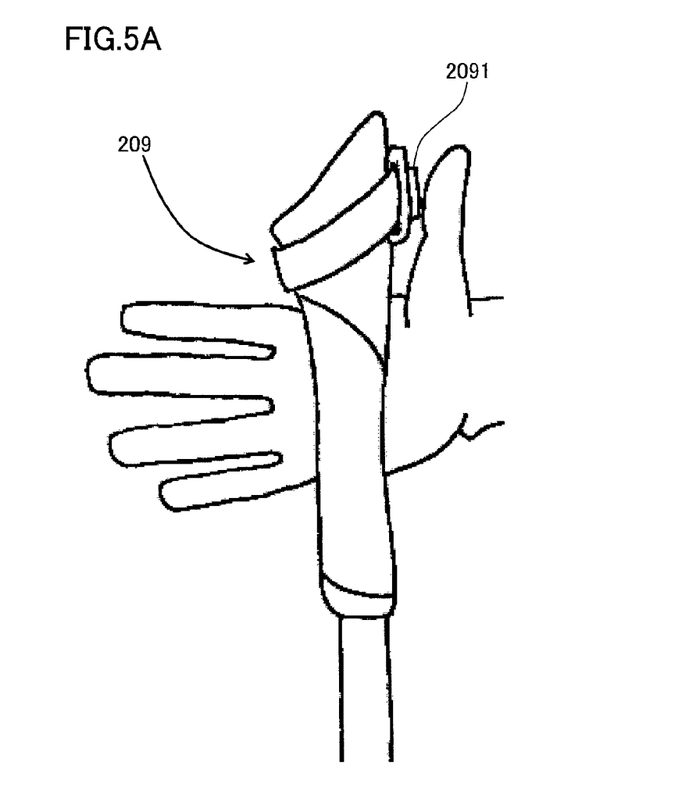
FIG. 5A is an enlarged schematic diagram showing the vicinity of a grip of the pole.

FIG. 5A is an enlarged schematic diagram showing the vicinity of grip 203 of pole 200. In FIG. 5A, strap 207 is not shown for the purpose of facilitating the description.

As shown in FIG. 5A, grip 203 of pole 200 in the present embodiment is further provided with an information transmission device (hereinafter simply referred to as a transmission device) 209. Transmission device 209 is provided with a transmission switch 2091. Transmission switch 2091 is used to transmit the signal described below from transmission device 209 by the user pushing the switch at the time of the start or end of Nordic walking using pole 200.

Figure 5B:
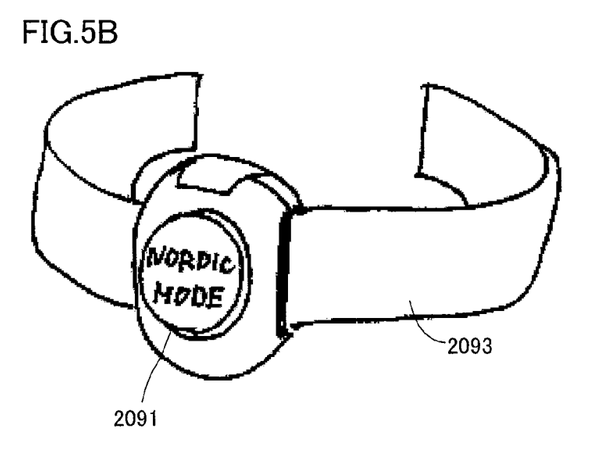
FIG. 5B is a diagram of a specific example of a transmission device.

A specific example of the configuration of transmission device 209 includes a belt 2093 for attachment to grip 203, as shown in FIG. 5B. It is preferable that transmission device 209 is attached to be located such that transmission switch 2091 can be pushed without a significant change in the posture in which pole 200 is used. Specifically, as shown in FIG. 5A, it is preferable that transmission device 209 is attached to grip 203 so as to be located such that the user can push transmission switch 2091 with any finger (a thumb in FIG. 5A) without a significant change in the posture (state) in which the user grasps grip 203 as a posture in which pole 200 is used. Furthermore, it is preferable that grip 203 is provided with a depression, a groove and the like (not shown) for fixing belt 2093 in a position suitable for attachment of transmission device 209.

It is to be noted that the configuration, the position to be attached and the like of transmission device 209 are not limited to those shown in FIGS. 5A and 5B but may be other configuration and position to be attached. The term "attach" used herein is, as shown in FIGS. 5A and 5B, not limited to the state in which two or more separate objects are in contact with each other but may include a configuration as one object. In other words, another specific example of the configuration of transmission device 209 may include a configuration in which it is incorporated into grip 203.

Figure 6:
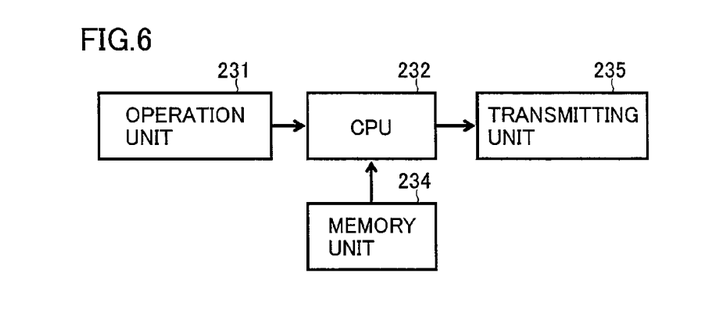
FIG. 6 is a block diagram of a specific example of the device configuration of the transmission device.

Referring to FIG. 6, transmission device 209 provided in pole 200 in the present embodiment is configured to include an operation unit 231 having the above-described transmission switch 2091, a CPU 232, a memory unit 234, and a transmitting unit 235. Memory unit 234 stores a pole identifier corresponding to the information that specifies pole 200.

Operation unit 231 inputs into CPU 232 an operation signal generated by pushing transmission switch 2091. CPU 232 receiving the operation signal reads the pole identifier from memory unit 234 for transmission from transmitting unit 235.

While the method of transmitting the pole identifier in transmitting unit 235 is not limited to a specific method, transmission with the short range wireless communication using, for example, Bluetooth (registered trademark) and the like may be adopted as the easiest method.

Figure 7:
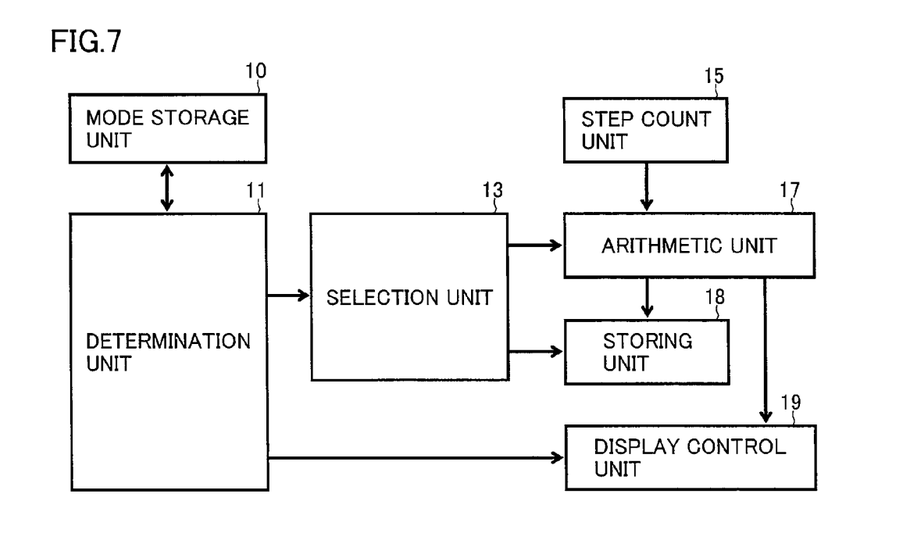
FIG. 7 is a block diagram of a specific example of the functional configuration of the pedometer.

FIG. 7 is a block diagram of a specific example of the functional configuration for performing the arithmetic operation accommodating the normal walking mode and the Nordic mode in pedometer 100A according to the present embodiment. While the function shown in FIG. 7 is formed mainly on CPU 162 by CPU 162 reading and executing the program stored in memory unit 163, some of the functions may be formed using the device configuration in FIG. 2.

Referring to FIG. 7, the above-described function of pedometer 100A according to the present embodiment is configured to include a mode storage unit 10 storing the current mode, a determination unit 11 determining the specified mode, a selection unit 13 selecting the parameter used for the arithmetic operation in the walking mode and the storage area storing the arithmetic result, a step count unit 15 counting the number of steps based on the electrical signal from sensor unit 150, an arithmetic unit 17 for calculating the amount of exercise, a storing unit 18 storing the calculation result in the predetermined storage area, and a display control unit 19.

Determination unit 11 monitors the signal received in receiving unit 166 and detects the signal transmitted by a shift switch 2091 being pushed in transmission device 209 of pole 200. In other words, determination unit 11 detects that the start or end of the Nordic mode is instructed in transmission device 209. Furthermore, determination unit 11 determines the specified mode based on the current mode stored in mode storage unit 10 and based on that the start or end of the Nordic mode is instructed in transmission device 209. Determination unit 11 analyzes the signal received in receiving unit 166 and reads the pole identifier contained in the signal. Determination unit 11 inputs the specified mode and the read pole identifier into selection unit 13 and display control unit 19.

Selection unit 13 refers to the information stored in storage unit 162b and selects the parameter used for the arithmetic operation in the specified mode and the storage area in memory unit 163 for storing the arithmetic result. Furthermore, if the specified mode is a Nordic mode, the parameter used for the arithmetic operation and the storage area in memory unit 163 for storing the arithmetic result are selected based on the input pole identifier. Then, the selected parameter is input into arithmetic unit 17 and the information specifying the selected storage area is input into storing unit 18.

Arithmetic unit 17 uses the input parameter to calculate the amount of exercise based on the number of steps counted in step count unit 15 and input the calculation result into storing unit 18 and display control unit 19. Storing unit 18 stores the calculation result in the storage area in memory unit 163 selected in selection unit 13. The amount of exercise calculated in arithmetic unit 17 includes a walking distance, number of steps and a walking distance counted after a certain period of time or more has elapsed since the start of walking, calorie consumption, an amount of fat burned, a walking speed, a walking pitch, an exercise intensity, the number of steps and a walking distance at a certain exercise intensity or above, and the like. Arithmetic unit 17 calculates one or two or more of them.

Display control unit 19 generates display data for displaying the calculation result on display unit 116 and controls the display on display unit 116. Display control unit 19 also generates display data for displaying the mark on display unit 116 that indicates whether the specified mode is a normal walking mode or a Nordic mode based on the determination result input from determination unit 11, and controls the display on display unit 116. The display data may be generated for displaying the mark on display unit 116 that indicates which pole is used in the Nordic mode based on the pole identifier input from determination unit 11.

Figure 8:
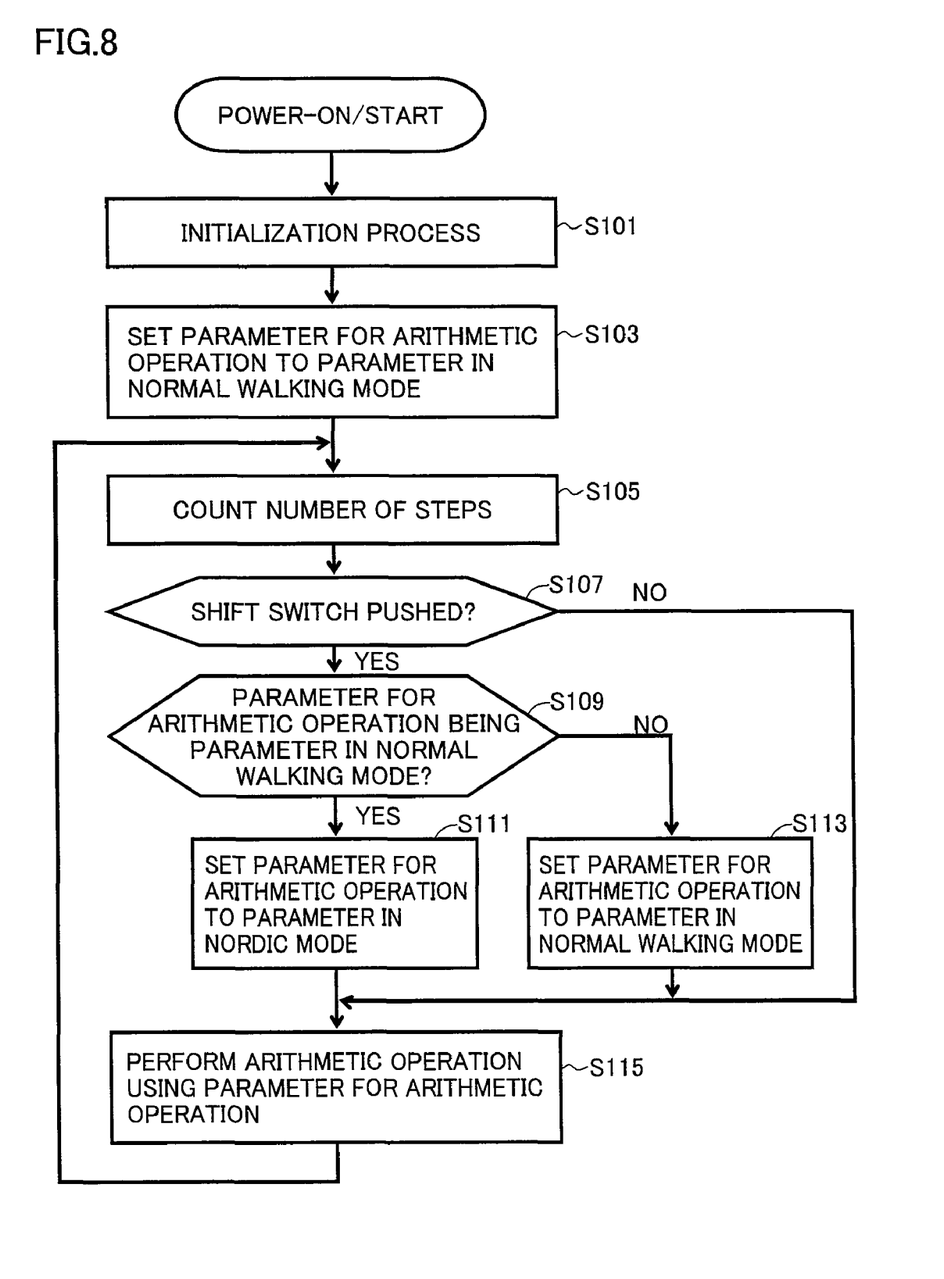
FIG. 8 is a flowchart of a specific example of the process in the pedometer.

FIG. 8 is a flowchart of a specific example of the process in pedometer 100A according to the present embodiment. The process shown in the flowchart in FIG. 8 is started upon power-on by inserting the battery into pedometer 100A, and the like, which is implemented by CPU 162 reading and executing the program stored in memory unit 163 to control each function shown in FIG. 7. It is also assumed that, prior to this process, the parameter used in the arithmetic operation in the normal walking mode and the storage area in memory unit 163 for storing the arithmetic result, and the parameter used in the arithmetic operation in the Nordic mode and the storage area in memory unit 163 for storing the arithmetic result are registered in advance to be stored in storage unit 162b.

Referring to FIG. 8, when pedometer 100A is first powered on, CPU 162 performs the process to initialize each unit (step S101). Determination unit 11 then sets mode storage unit 10 in the normal walking mode as a default mode. Selection unit 13 sets the parameter in the normal walking mode as a parameter used for the arithmetic operation (step S103). Step count unit 15 starts counting the number of steps (step S105).

Determination unit 11 monitors the signal received in receiving unit 166. When detecting that shift switch 2091 is pushed in transmission device 209 of pole 200 (YES in step S107), determination unit 11 determines the specified mode (step S109). Selection unit 13 sets the corresponding parameter (step S111 or S113).

Specifically, in the case where the normal walking mode is set as a current mode in mode storage unit 10 when it is detected that shift switch 2091 is pushed (YES in step S109), determination unit 11 sets mode storage unit 10 in the Nordic mode as the next mode. Selection unit 13 sets the parameter in the Nordic mode as a parameter used for the arithmetic operation (step S111). In this case, as shown in FIG. 3, if pedometer 100A stores the parameter used in the Nordic mode for each pole identifier, the parameter corresponding to the pole identifier contained in the signal transmitted from transmission device 209 is set. Furthermore, in the case where the equation used to calculate the amount of exercise is different between the normal walking mode and the Nordic mode, the program used for the arithmetic operation is set in the above-mentioned step S111.

In the case where the Nordic mode is set as a current mode in mode storage unit 10 when it is detected that shift switch 2091 is pushed (NO in step S109), determination unit 11 sets mode storage unit 10 in the normal walking mode as the next mode. Selection unit 13 sets the parameter in the normal walking mode as a parameter used for the arithmetic operation (step S113).

At the predetermined timing, arithmetic unit 17 uses the parameter set in the above-described step S103, S111 or S113 to calculate the amount of exercise (step S115). Display control unit 19 controls to display the arithmetic result on display unit 116.

By repeating the processes in the above-described steps S105-S115, the number of steps is counted during power-on and the normal walking mode or the Nordic mode is automatically selected during the walking mode to perform the arithmetic operation in that mode.

The above-described processes are performed in pedometer 100A according to the present embodiment, which allows the parameter such as the stride length to be changed during walking such as Nordic walking in which the stride length is intentionally changed, by the simple operation using the tool to be used for walking exercise. Therefore, even in the case where the parameter such as the stride length is changed during the walking mode, the exact amount of exercise can be calculated by the simple operation.

In the above-described specific example, it is assumed that pedometer 100A stores the parameter for each pole as a parameter used in the Nordic mode and sets the parameter in accordance with the pole identifier contained in the signal from transmission device 209. However, it may be simply that one parameter used in the Nordic mode is stored and the signal indicating that shift switch 2091 is pushed is received from transmission device 209 to thereby determine that the Nordic mode is instructed and to set the parameter. The configuration in which pedometer 100A stores the parameter for each pole allows pedometer 100A to be used for each of a plurality of poles registered in advance and also allows each amount of exercise to be calculated for a plurality of users using the same pedometer 100A.

Furthermore, in the above-described steps S103, S111 and S113, display control unit 19 controls to display the image on display unit 116 indicating that the specified mode is a normal walking mode or a Nordic mode.

Figure 9:
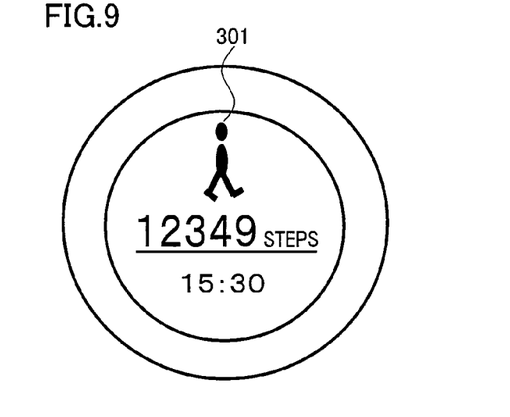
FIG. 9 is a diagram of a specific example of a display screen in the normal walking mode.
Figure 10:
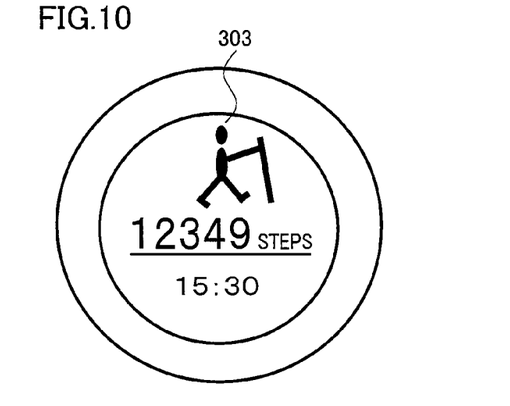
FIG. 10 is a diagram of a specific example of the display screen in the Nordic mode.

Specifically, in the above-described steps S103 and S113, display control unit 19 controls to display a mark 301 as shown in FIG. 9 on display unit 116 indicating that the specified mode is a normal walking mode. In the above-described step S111, display control unit 19 controls to display a mark 303 as shown in FIG. 10 indicating that the specified mode is a Nordic mode. Although, in the present embodiment, these modes are indicated by marks 301 and 303, respectively, only one of them (for example, a Nordic mode) may be indicated.

By the above-described display control carried out by pedometer 100A according to the present embodiment, it becomes possible to readily find out which parameter is set as a parameter used for the arithmetic operation when the parameter such as the stride length is changed during the walking mode.

[First Modification]

As a first modification, a pedometer 100B may be configured such that, when receiving the signal from transmission device 209 of pole 200 indicating the start or end of the Nordic mode, the parameter to be used for the arithmetic operation in the Nordic mode is calculated based on the parameter used for the arithmetic operation in the normal walking mode. For the purpose of simplifying the description, in the first modification, it is assumed that the parameter used for the arithmetic operation in the Nordic mode does not vary with poles and the storage area storing the arithmetic result also does not vary with poles.

Storage unit 162b of pedometer 100B stores a coefficient for calculating the parameter used for the arithmetic operation in the Nordic mode based on the parameter used for the arithmetic operation in the normal walking mode, in place of the parameter used for the arithmetic operation in the Nordic mode. In the present invention, the above-described coefficient is not limited to a particular value but is assumed to be 1.3 as a specific value when the parameter is the number of steps. In this case, the stride length in the Nordic mode is assumed to be 1.3 times greater than that in the normal walking mode and the stride length is used to calculate the walking distance and the like. Furthermore, the parameter used for calculating calorie consumption is assumed to be 1.4 as a specific value of the coefficient for another parameter. In this case, the parameter in the Nordic mode is assumed to be 1.4 times greater than the calorie consumption calculated in the normal walking mode and the parameter is used to calculate calorie consumption.

It is to be noted that the coefficient stored in storage unit 162b may be set in advance or may be set or modified by the user. In the specific example described below, for the purpose of simplifying the description as described above, it is assumed that one coefficient is stored for each parameter, but a different coefficient set for each pole allows the parameter to be obtained for each pole as in the above-described specific example.

Figure 11:
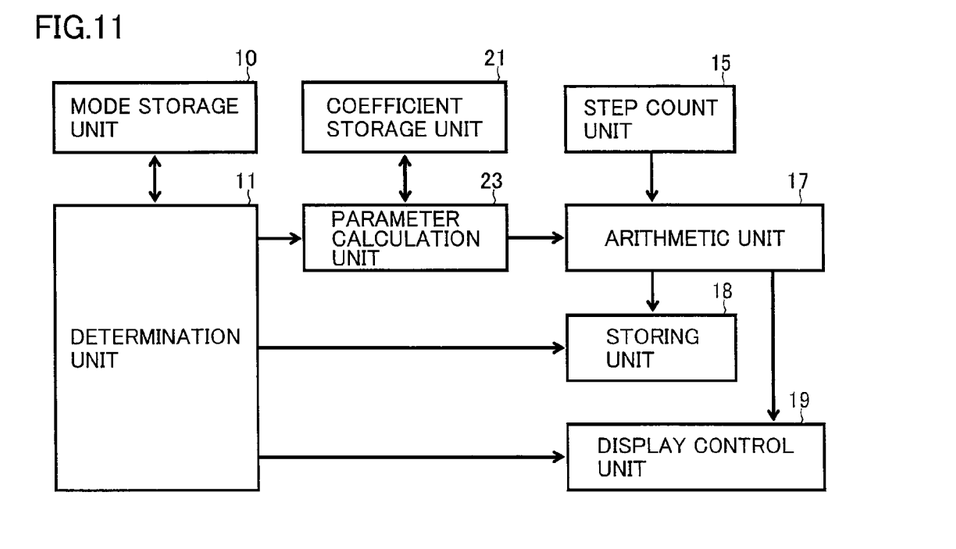
FIG. 11 is a block diagram of a specific example of the functional configuration of the pedometer.

FIG. 11 is a block diagram of a specific example of the functional configuration for the arithmetic operation accommodating the normal walking mode and the Nordic mode in pedometer 100B according to the first modification. Referring to FIG. 11, pedometer 100B according to the first modification includes a parameter calculation unit 23 in place of selection unit 13 in the functional configuration in pedometer 100A shown in FIG. 7. It also includes a coefficient storage unit 21. Coefficient storage unit 21 is configured to include storage unit 162b and stores the above-described coefficient for each parameter.

In pedometer 100B, determination unit 11 inputs the specified mode into parameter calculation unit 23, storing unit 18 and display control unit 19. For the purpose of simplifying the description, in the first modification, storing unit 18 stores the arithmetic result in the storage area in the normal walking mode set in advance or in the storage are in the Nordic mode according to the mode input from determination unit 11.

In the case where the mode input from determination unit 11 is a normal walking mode, parameter calculation unit 23 reads the parameter which is set in advance and used for the arithmetic operation in the normal walking mode, and inputs it into arithmetic unit 17. In the case where the mode input from determination unit 11 is a Nordic mode, the coefficient stored in coefficient storage unit 21 is used to calculate the parameter to be used for the arithmetic operation in the Nordic mode based on the parameter used for the arithmetic operation in the normal walking mode, and input it into arithmetic unit 17.

The process in pedometer 100B according to the first modification is almost the same as the process shown in FIG. 8. In the above-described step S111, in pedometer 100B, the coefficient stored in coefficient storage unit 21 is used in parameter calculation unit 23 to calculate the parameter to be used for the arithmetic operation in the Nordic mode based on the parameter used for the arithmetic operation in the normal walking mode and to set the parameter in the Nordic mode as a parameter used for the arithmetic operation.

The above-described configuration of pedometer 100B according to the first modification eliminates the need for the user to input the parameter such as the number of steps in the Nordic mode, which simplifies the setting for the user.

[Second Modification]

As a second modification, in a pedometer 100C, button 117a may be used in place of transmission device 209 attached to pole 200, to give an instruction to start or end Nordic walking. In this case, determination unit 11 determines the mode instructed based on an operation signal from operation unit 117.

This configuration allows the parameter such as the stride length to be changed by the operation in the pedometer alone during walking such as Nordic walking in which the stride length is intentionally changed. Thus, the configuration of the walking-exercise-amount calculation system can be simplified.

Although the above-described specific examples have described Nordic walking as a specific example of the walking exercise in which the stride length is intentionally changed, the walking exercise is not limited to Nordic walking but may be, for example, race walking and the like. In this case, it is preferable that transmission device 209 is attached to the tool to be used for walking exercise (for example, pole and shoes), the special-purpose wear and the like so as to be located such that the user can push transmission switch 2091 without significantly changing the posture during use.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A body motion detection device comprising:
 a count unit counting a number of steps in a walking mode by detecting body motion, said walking mode including a first walking mode and a second walking mode;
 a calculation unit calculating an amount of exercise based on said counted number of steps;
 a receiving unit receiving from another device a signal indicating start or end of said second walking mode, said signal containing information identifying said another device; and
 a setting unit setting, as a parameter used in said calculation unit, a parameter for said first walking mode when said signal indicates said end of said second walking mode and a parameter for said second walking mode when said signal indicates said start of said second walking mode.

2. The body motion detection device according to claim 1, further comprising a first storage unit storing the parameter for said first walking mode and the parameter for said second walking mode, wherein
 said setting unit reads the parameter for said first walking mode or the parameter for said second walking mode from said first storage unit for setting as a parameter used in said calculation unit.

3. The body motion detection device according to claim 1, further comprising
 a second storage unit storing the parameter for said first walking mode, and
 a third storage unit storing a coefficient for calculating the parameter for said second walking mode based on the parameter for said first walking mode, wherein
 said setting unit reads said coefficient from said third storage unit and calculates the parameter for said second walking mode from the parameter for said first walking mode based on said signal for setting as a parameter used in said calculation unit.

4. The body motion detection device according to claim 1, further comprising
 a display unit displaying said calculated amount of exercise, and
 a display control unit controlling to display a mark on said display unit identifying whether said walking mode is said first walking mode or said second walking mode.

5. The body motion detection device according to claim 1, wherein said setting unit sets an equation for said first walking mode or an equation for said second walking mode as an equation used in said calculation unit.

6. The body motion detection device according to claim 1, further comprising a storing unit storing said calculated amount of exercise in a storage area, wherein
said storing unit stores the amount of exercise calculated using the parameter for said first walking mode in a first area of said storage area and stores the amount of exercise calculated using the parameter for said second walking mode in a second area of said storage area.

7. The body motion detection device according to claim 1, wherein
said setting unit sets a parameter corresponding to said another device as a parameter for said second walking mode based on said information contained in said signal.

8. The body motion detection device according to claim 1, wherein
said first walking mode is a normal walking mode and said second walking mode is a Nordic walking mode, said another device is a transmission device attached to a Nordic walking pole, and
said parameter includes a stride length in each walking mode.

9. The body motion detection device according to claim 1, wherein said amount of exercise includes at least one of a walking distance, number of steps counted after a certain period of time or more has elapsed since start of walking, a walking distance calculated based on the number of steps counted after a certain period of time or more has elapsed since start of walking, calorie consumption, an amount of fat burned, a walking speed, a walking pitch, an exercise intensity, number of steps at a certain exercise intensity or above, and a walking distance calculated based on the number of steps at a certain exercise intensity or above.

10. The body motion detection device according to claim 1, wherein said another device is a transmission device attached to a pole.

* * * * *